United States Patent [19]

Elton et al.

[11] 4,201,955

[45] May 6, 1980

[54] METHOD OF PRODUCING POPULATION INVERSION AND LASING AT SHORT WAVELENGTHS BY CHARGE TRANSFER

[75] Inventors: Raymond C. Elton, Potomac; Robert H. Dixon, Bowie, both of Md.

[73] Assignee: The United States of America as represented by the Secretary of the Navy, Washington, D.C.

[21] Appl. No.: 889,072

[22] Filed: Mar. 22, 1978

[51] Int. Cl.$^2$ .............................................. H01S 3/22
[52] U.S. Cl. ............................................. 331/94.5 G
[58] Field of Search ................... 331/94.5 G, 94.5 P, 331/94.5 PE; 330/4.3; 250/493

[56] References Cited

U.S. PATENT DOCUMENTS

| 4,053,783 | 10/1977 | Scully | 331/94.5 G |
|---|---|---|---|
| 4,058,486 | 11/1977 | Mallozzi et al. | 331/94.5 G |

OTHER PUBLICATIONS

Duguay, X-ray Lasers: A Status Report, Laser Focus (Nov., 1973) pp. 41–46.
Dixon et al., Resonance Charge Transfer and Population Inversion Following $C^{5+}$ and $C^{6+}$ Interactions With Carbon in a Laser-Generated Plasma. Phys. Rev. Lett., vol. 38 (May 9, 1977) pp. 1072–1075.

Primary Examiner—William L. Sikes
Attorney, Agent, or Firm—R. S. Sciascia; Philip Schneider; Melvin L. Crane

[57] ABSTRACT

A stimulated emission device operative in the ultraviolet and soft x-ray regions. A high-power infrared laser is focused on a slab target vaporizing the material and generating highly stripped target ions with varying velocities. Just prior to laser initiation, a gaseous environment of helium, hydrogen, argon or neon is injected to surround the target (e.g., carbon) at a pressure of from 1–10 Torr. The injected gas and associated electrons modify and mix the interacting particles originating from the vaporized target. Ion-atom resonance, charge-transfer reactions take place to form excited-state ions to produce amplified stimulated emission in the 300–800 Ångstrom region.

16 Claims, 2 Drawing Figures

METHOD OF PRODUCING POPULATION INVERSION AND LASING AT SHORT WAVELENGTHS BY CHARGE TRANSFER

BACKGROUND OF THE INVENTION

This invention relates to lasers and more particularly to short wavelength lasers in the extreme ultraviolet x-ray spectral regions.

Heretofore stimulated emission of radiation has been obtained from solid state, gaseous, and chemical lasers as well as from semiconductors whose outputs are in the infrared visible and near ultraviolet wavelengths. Many attempts have been made to obtain lasers with an output in the x-ray region. One such U.S. Pat. No. 4,053,783 has been issued in which stimulated x-ray emission at 304 Å has been proposed. This arrangement makes use of a pulsed helium-ion beam, stripped of electrons to its nuclei, which is directed upon a jet of hydrogen gas to cause a population inversion due to the resonant charge exchange between the ions and the hydrogen atoms in the gas jet.

Experimental results obtained in furthering the present invention are found in an article "Resonance Charge Transfer and Population Inversion Following $C^{5+}$ and $C^{6+}$ Interactions With Carbon in a Laser-Generated Plasma", by R. H. Dixon and R. C. Elton, Physical Review Letters, Vol. 38, pages 1072–1075, May 9, 1977, which is incorporated herein by reference.

SUMMARY OF THE INVENTION

This invention is directed to generating inverted excited-state population densities in highly-ionized atoms by resonance charge transfer at the high densities present in plasmas, which results in laser action in the extreme ultraviolet and soft x-ray spectral regions. The target material immersed in a background gas is vaporized by a laser to produce the plasma from which population inversion is obtained. The partially ionized background gas and electrons act as a catalyst for the reaction since they neutralize and localize the initial target ions and attenuate the following target ions to an optimum velocity for the charge transfer process.

DETAILED DESCRIPTION

Figure 1:
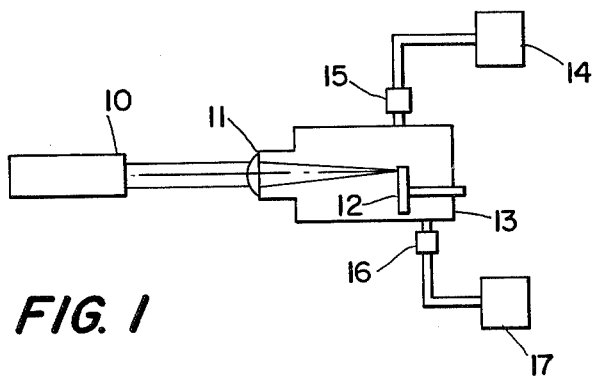
FIG. 1 illustrates an X-ray laser system.

FIG. 1 illustrates a schematic drawing of an x-ray laser system made in accordance with the teaching of this invention. The output of a pulsed Nd glass laser 10 or any other suitable high power laser is focused by a lens system 11 to an elongated image with an aspect ratio of approximately 10 to 1. The laser beam is focused on the surface of a rotatable target 12, such as carbon, to an irradiance of at least $2 \times 10^{11}$ W/cm$^2$. The target is secured within a vacuum chamber 13 to which is added a surrounding gas, for example, helium. hydrogen, argon, or neon at a pressure of from 1 to 10 Torr. The gas is admitted from a pressurized tank 14 by a valve 15 just prior to the irradiation by the laser pulse. The admitted gas and target contaminants are removed subsequent to each operation through a valve 16 and vacuum exhaust pump 17. The operation of the system as an x-ray amplifier depends upon the surrounding gas and associated electrons/ions. The gaseous medium and the associated free electrons produced by ionization surrounding the carbon contribute both to the formation of neutral target atoms from fast ions and to the attenuation of both the expansion velocity of the reacting ions. This results in the creation of a vital ion-atom mixing layer about 5–25 mm from the target in which appropriate relative velocities exists.

In operation, the system is set up with the target in a housing which is evacuated. The laser is aligned to direct its output through the focusing optics onto the target. Just prior to activating the laser, the gaseous medium is admitted at a pressure of from 1–10 Torr. The laser is activated and the incident radiation vaporize the target to generate highly stripped target ions which accelerate at various velocities. The partially ionized gaseous medium and associated charged particles contribute to the formation of neutral atoms and to the attenuation of the expansion velocity of the following target ions. This results in the creation of a vital ion-atom mixing layer about 5–25 mm from the target. Subsequently, ions attenuated by the atom/ion/electron mixture enter the mixing layer with the appropriate relative velocity. In this environment, ion-atom-resonance charge transfer reactions take place. In particular, for a carbon slab target charge transfer reaction to take place between carbon atoms and $C^{5+}$ and $C^{6+}$ ions, to form excited state (asterisk) $C^{4+}$ and $C^{5+}$ ions, respectively, $C + C^{5+,6+} \rightarrow C + (C^{4+,5+})^* + \Delta E_{if}$.

$\Delta E_{if}$ is the difference in binding energies of the initial and final states at infinite separation.

Figure 2:
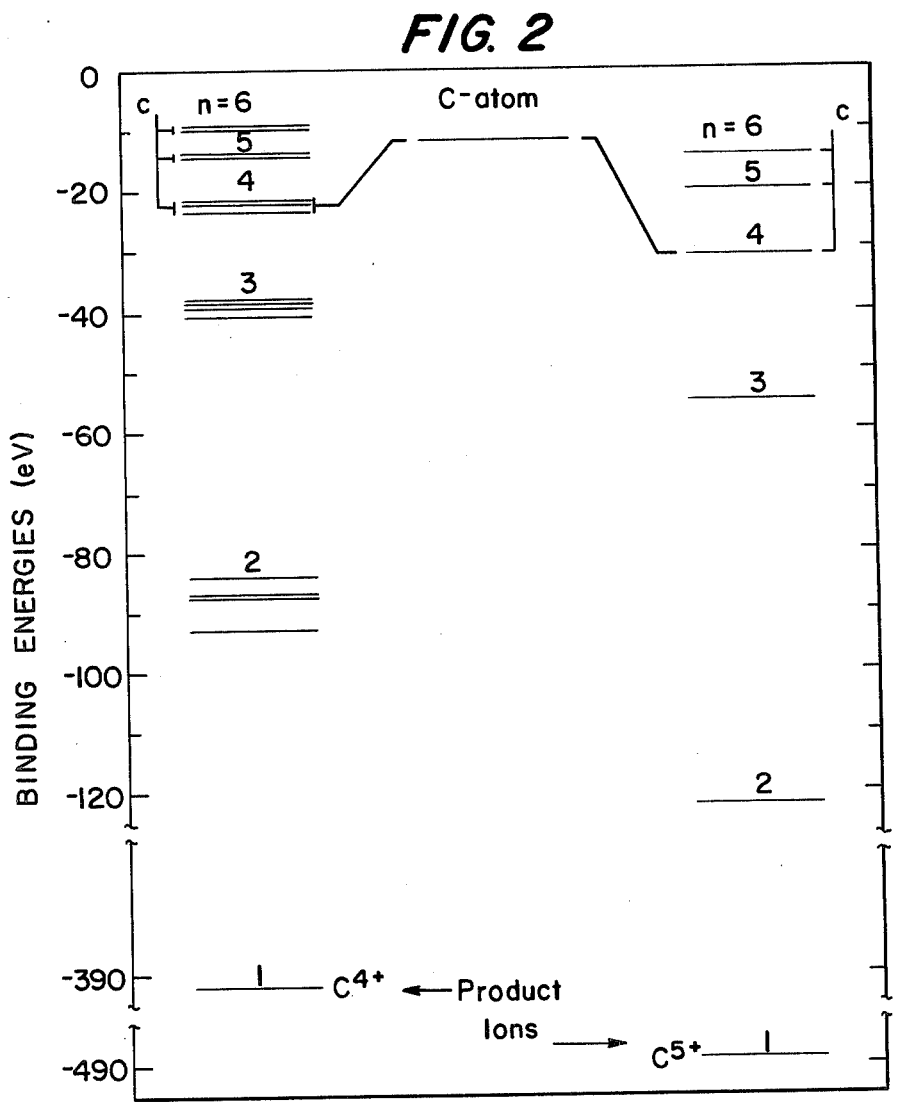
FIG. 2 is a binding energy diagram for an electron in, for example, an initial carbon atom and either a $C^{4+}$ or $C^{5+}$ final ion.

FIG. 2 illustrates the example of the binding energy for an electron in the initial carbon atom and either a $C^{4+}$ or $C^{5+}$ final (product) ion. Electron collisional mixing of the states for $n \geq 4$ is indicated by "c" with several collisionally mixed levels indicated for $C^{4+}$. The relative populations of the excited states in the $C^{4+}$ and $C^{5+}$ product ions were determined from the $np^1P_1 \rightarrow 1s^1S_o$ resonance series spectral lines in the 30–40 Å spectral region. Preferential population of the $n=4$ and $n=5$ excited states occurs with inverted population densities relative to the $n=3$ state, with stimulated emission at 350–760 Å. The cross-section resonance for $n=4$ state population occurs at a velocity of about $5 \times 10^6$ cm/sec. Direct population of the $n=3$ state requires velocities of greater than $10^8$ cm/sec. Likewise $n \geq 5$ state population requires velocities less than $10^6$ cm/sec with very narrow resonances at correspondingly large pseudo-crossing diameters.

An ion density of about $10^{18}$ cm$^{-3}$ is necessary in the plasma region for significant amplification. Electron collisional excitation and recombination explain the distribution of the $n=4$ population density among higher-lying states, and charge transfer into the $n=5$ levels cannot be completely ruled out if some ions are slowed sufficiently at late times. The selective excitation takes place from 5–25 mm from the surface of the vaporized target approximately 100 ns after the primary (infrared) laser irradiation.

A vital phenomenon is the early formation of a significant density of neutral target atoms in the 5 to 25 mm region away from the target. These atoms are formed by the rapid neutralization of initial ions. Momentum transfer and electrostatic forces during and after neutralization leave the target atoms in this region in static equilibrium. Also, of importance is the velocity attenuation for the sheath of ions moving into the preformed atomic atmosphere to velocities appropriate for the charge transfer reaction. With a carbon target, relative population densities for n=5, 4 and 3 levels in the $C^{4+}$ and $C^{5+}$ product ions have been determined to be in the ratios of 3.8 to 3.4 to 1 for $C^{4+}$ ions and 3.8 to 2.6 to 1 for $C^{5+}$ ions. These ratios indicate a definite presence of population inversion for the transitions 4–3 and 5–3 of each species. The ratios between the n=5 and n=4 levels are consistent with collisional excitation of the ions as they move into a stationary electron cloud with the measured velocity. The inversions continue for the duration of the reaction region, i.e., in a quasi-cw state, since the rate of the n=3 decay exceeds the population rate. This extended inversion, not limited by excited state lifetimes, is an important feature of this device. With sufficient density, amplification of spontaneous emission exists at wavelengths extending from 350–760 Angstroms depending on the excited ion density.

Anomalous intensities for spectral lines in, for example, the resonance series of $C^{4+}$ and $C^{5+}$ ions associated with transactions originating on $n \geq 4$ levels are directly related to enhanced preferential population of the n=4 level. Population inversions occur on levels associated with very short wavelengths. The detailed processes generating the interaction zone in the gaseous atmosphere are not as yet fully understood.

Obviously many modifications and variations of the present invention are possible in light of the above teachings. It is therefore to be understood that within the scope of the appended claims the invention may be practiced otherwise than as specifically described.

What is claimed and desired to be secured by Letters Patent by the United States:

1. Apparatus for generating stimulated emission comprising:
    a housing,
    a target within said housing,
    means for admitting a gaseous medium about said target,
    laser means for irradiating said target to generate highly stripped target ions with varying velocities,
    whereby reactions between said highly stripped target ions and a gaseous medium electron environment about said target produce a population inversion with stimulated emission.
2. Apparatus as claimed in claim 1 in which:
    said gaseous medium is selected from the group consisting of helium, hydrogen, argon and neon.
3. Apparatus as claimed in claim 1 wherein:
    said gaseous mediumm is helium.
4. Apparatus as claimed in claim 3 in which:
    said helium gas is admitted at a pressure of from 1 to 10 Torr.
5. Apparatus as claimed in claim 1 in which:
    said laser means produces a target irradiance of at least $2 \times 10^{11}$ watts/cm$^2$.
6. Apparatus as claimed in claim 5 in which:
    said gaseous medium is helium.
7. Apparatus as claimed in claim 6 which includes:
    means for evacuating said housing.
8. Apparatus as claimed in claim 6 in which:
    said helium is admitted at a pressure of from 1 to 10 Torr.
9. Apparatus as claimed in claim 1 in which:
    said target is selected from the group consisting of beryllium, boron, carbon, nitrogen.
10. Apparatus as claimed in claim 1 wherein said target is carbon and said medium/electron environment comprises a helium/electron mixture.
11. A method for generating stimulated emission comprising:
    surrounding a target with a gas and electron mixture,
    irradiating said target with a high power laser output to generate highly stripped target ions, thereby forming a plasma with inverted excited state population densities,
    whereby stimulated emission is generated by resonance charge transfer in the inverted excited state population densities in said plasma.
12. A method as claimed in claim 11 in which:
    the gas in said mixture is selected from the group consisting of helium, hydrogen, argon and neon.
13. A method as claimed in claim 11 in which:
    the gas in said mixture is helium.
14. A method as claimed in claim 13 wherein:
    said target is irradiated by a laser with an output of at least $2 \times 10^{11}$ Watts/cm.
15. A method as claimed in claim 11 in which said target is selected from the group consisting of beryllium, boron, carbon, nitrogen.
16. A method as claimed in claim 11 wherein said target is carbon.

* * * * *